United States Patent Office 3,502,348
Patented Mar. 24, 1970

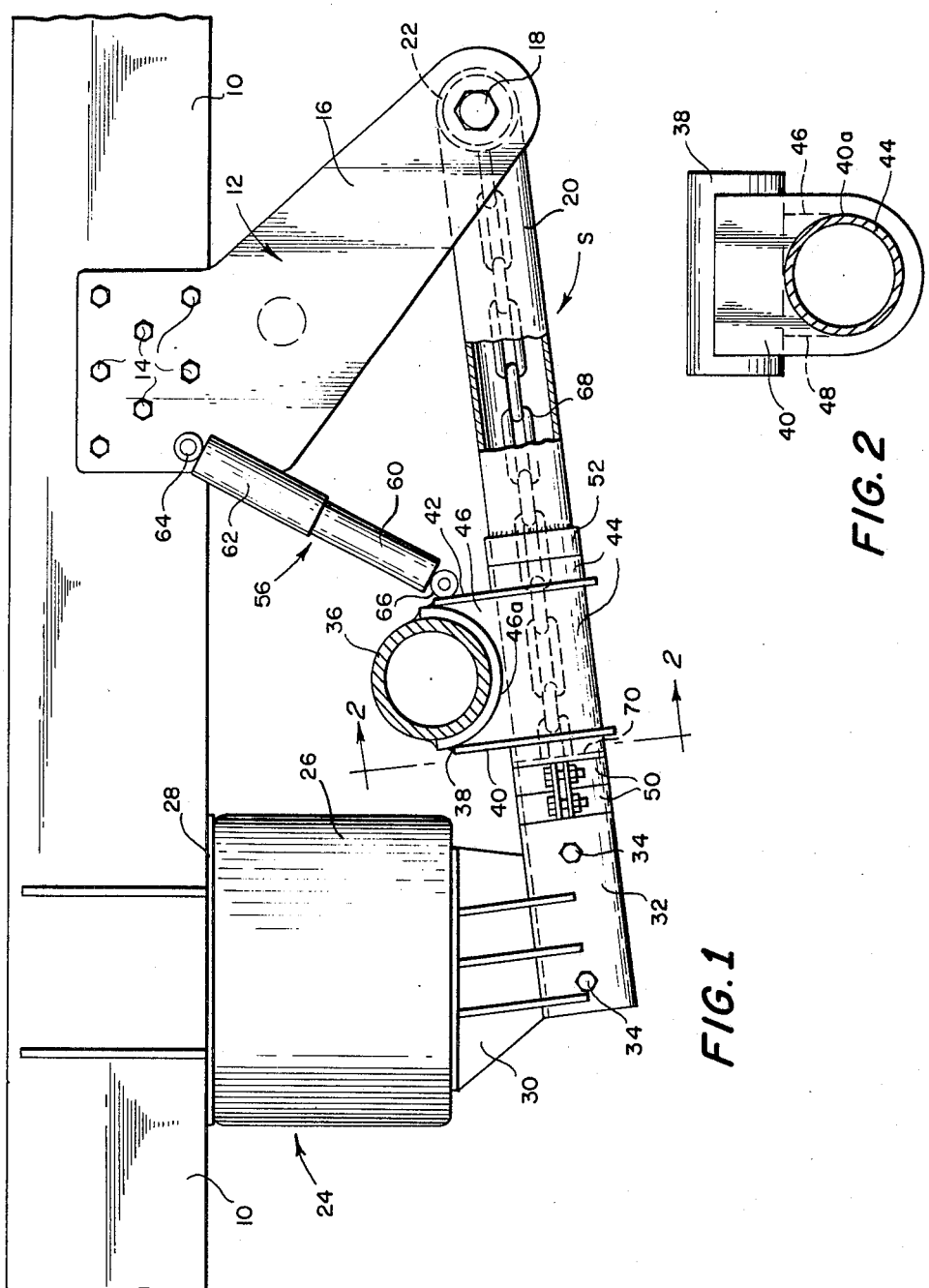

3,502,348
SUSPENSION SYSTEM FOR AUXILIARY
AXLE UNIT
Gale Bellamy, Hiltons, Va., and Harold Wyant, Sioux
City, Iowa, assignors to Hil-Air Corporation, Hiltons,
Va.
Filed May 23, 1968, Ser. No. 731,479
Int. Cl. B62d 49/06, 61/12
U.S. Cl. 280—124                                  9 Claims

ABSTRACT OF THE DISCLOSURE

A suspension system for an auxiliary axle unit includes a spring hanger for pivotably mounting one end of a torque tube which mounts an axle seat. The other end of the torque tube is supported by an air spring secured to the frame of the vehicle. A safety chain located within the torque tube provides a supporting connection in the event of failure of the tube as well as an indication of such a failure as the chain is tensioned from a normal slack position. The mounting for the axle seat permits both pivotable and longitudinal movement of the tag axle.

FIELD OF THE INVENTION

The present invention relates to suspension systems for automotive vehicles and more particularly to an improved suspension system for mounting an auxiliary axle unit.

THE PRIOR ART

Tractor trailer trucks and other similar automotive vehicles often employ auxiliary axle units for carrying increased loads. A number of these units, frequently referred to as "tag axles" or "pusher axles" depending on the position thereof, may be mounted on the tractor frame to provide an increased load carrying capability. The suspension system for each axle includes a pair of supporting units each commonly made up of a fixed pivotable support such as spring hanger, a supporting arm including means thereon for mounting the axle, and an air spring, the pivotable support and the air spring being affixed to the tractor frame and the supporting arm being suspended therebetween. Such suspension systems although generally effective are subject to failure particularly because of the rugged use to which they are put and where, for example, there is fracture of the one of the supporting arms the entire axle unit may separate from the tractor frame causing serious damage. Another shortcoming of such systems is the rigidity of the support provided for the auxiliary axle. Although it is, of course, necessary to provide firm mounting support for such an axle a rigid support will frequently put strain on the axle support mounting particularly where load shifts occur. Further the lack of adjustability of such supports prevents varying the point of support for the auxiliary axle with variation in loading and thus may provide restrictions on achieving optimum load distribution.

SUMMARY OF THE INVENTION

In accordance with the invention a suspension system of the type including a pivotably mounted support arm and an air spring therefor is provided which includes safety means providing an auxiliary supporting connection between the support arm mountings in the event of failure of the support arm, the safety means additionally providing, when assuming a supporting position, an indication of the occurrence of such a failure.

In accordance with a presently preferred embodiment of the invention the supporting arm comprises a support tube, commonly referred to as a torque tube, and the safety means comprises a safety chain located within the tube and suspended between two fixed points therein. A seating mount for an axle is mounted on the tube and thus where there is failure of the tube as through fracture the safety chain will provide a supporting connection for the axle seating mount between the fractured portions of the tube. The safety chain is supported such that some slack exists therein under normal conditions and will be tensioned upon failure of the support tube. A shift in loading as evidenced by a jerking motion occasioned by the tensioning of the chain will be sensed by the driver to provide an indication of the existence of trouble in the axle unit.

In accordance with a further feature of the invention the seating for the auxiliary axle is mounted on the support tube such as to permit limited rotation of the axle about the axis of the support tube. Additionally, the position of the axle seating may be fixed at various positions along the longitudinal extent of the support tube.

Other features and advantages of the invention will become apparent upon consideration of the detailed description of the invention found hereinbelow.

BRIEF DESCRIPTION OF THE DRAWINGS

FIGURE 1 is a side elevation view, partially in section, of a presently preferred embodiment of the invention wherein a portion of the torque tube shown therein is broken away to show a section of a safety chain located with the tube;

FIGURE 2 is a detail view of the axle seat of FIGURE 1 taken generally along lines 2—2 of FIGURE 1.

DESCRIPTION OF THE PREFERRED EMBODIMENT

Referring to FIGURE 1, a suspension generally denoted S is mounted on a portion of the tractor frame 10. A spring hanger 12 which is affixed, at the upper end thereof, to frame 10 by a series of bolts 14 includes a pair of parallel arms 16 (one of which is shown) which extend outwardly of the frame 10 at an angle thereto as shown.

A bolt 18 extending through aligned bores in the lower ends of hanger arms 16 provides a pivotable mounting for an elongate torque tube 20. A cylindrical mounting member 22 welded to the end of torque tube 20 and arranged with the longitudinal axis thereof perpendicular to the longitudinal axis of tube 20 is rotatable about bolt 18 and is spaced therefrom by a suitable elastic bushing (not shown).

An air spring 24 includes a conventional air bag 26 secured to frame 10 through an upper bag plate 28. A lower bag stool 30 includes a bag stool tube 32 welded thereto for affixing the air bag 26 to one end of torque tube 20. Torque tube 20 is concentrically received in bag stool tube 32 and is affixed thereto by a pair of transverse bolts 34.

An axle 36 of an auxiliary axle unit is mounted in and welded to a semi-cylindrical axle seat 38 mounted on torque tube 20. The mounting for axle seat 38 includes flat parallel side members 40 and 42 welded to opposite sides of seat 38 and having aligned bores (bore 40a being shown in FIGURE 2) therein for receiving a cylindrical mounting tube 44, tube 44 being welded to members 40 and 42. Flat, parallel support members 46 and 48 are welded to opposite sides of tube 44 and each includes an upper semi-cylindrical recess (recess 46a being seen in FIGURE 1) in which axle seat 38 is mounted, seat 38 likewise being welded to members 46 and 48. Mounting tube 44 is rotatable and slidable on torque tube 20 and thus it will be appreciated that some pivoting of axle 36 about the axis of torque tube 20 is permitted. This pivoting of the axle 36 on the mounting therefor serves to relieve strain on the mounting and to combat failure thereof or damage thereto caused by jarring of the axle unit during driving.

Because of the sliding relationship therebetween the position of mounting tube 44 along the longitudinal axis of torque tube 20 may be varied. The position of tube 44 may be fixed through cooperation between a series of spacer clamp rings 50 (two being shown in FIGURE 1) and a fixed stop 52. Stop 52 may be formed as a front ing welded to torque tube 20 which abuts against one end of tube 44 and which serves to limit the travel of tube 44 along tube 20. Clamp rings 50 which are removably fixed to torque tube 20 are shown disposed between and abutting against bag stool tube 32 and the other end of tube 44. It will be appreciated that by varying the positions of the clamps 50 the fixed position of mounting tube 44 along tube 20 may be varied. For example, the uppermost of clamps 50 may be re-positioned between the upper end of tube 44 and stop ring 52 with the resulting shifting of the position of tube 44 downwardly along tube 20 by an amount equal to the width of clamp 50. It will be understood that the arrangement illustrated is merely exemplary and that, for example, more clamps or clamps of different widths may be used.

A shock absorber 56 including telescoping portions 60 and 62 is disposed between a mounting stud 64 affixed to frame 10 and a mounting stud 66 welded to the face of side plate member 42 of the mounting for seat 38.

In accordance with a very important feature of the invention a safety chain 68 is mounted within torque tube 20 and extends along the longitudinal axis thereof. Although the use of a chain is presently preferred a similar flexible member such as a cable may also be utilized. Chain 68 is fixed at one end to cylindrical mounting member 22 and at the other end to a flat upright safety bar 70 welded between opposite inner surfaces of tube 20. Chain 68 is normally mounted such that there is some slack therein and, upon fracturing or other breaking of torque tube 20, is tensioned between support members 22 and 70. Safety chain 68 thus serves as a supporting connection between the fractured portions of tube 20 which maintains the mounting support for axle 36 through seat 38. It is noted that there will be shifting of the load upon the failure of the torque tube 20 as chain 68 is tensioned and the resulting jerking motion thus provides an indication to the driver of the existence of trouble in the axle unit. Thus the use of safety chain 68 provides an additional safety feature as compared to an arrangement where a torsion bar or the like is suspended within the torque tube in that with the latter arrangement there would be no indication of failure, the torsion bar merely serving as a connecting support in the place of the torque tube. Under these circumstances the failure of the torque tube may well go undetected until the safety torsion bar itself fails with consequent serious damage. It will of course be appreciated that upon failure of the torque tube at a point above the seating for the axle 36 the entire axle unit will tend to separate from the tractor frame 10.

It will be understood that the portion of the suspension shown in FIGURE 1 is duplicated on the other side of the tractor frame and thus that the axle 36 is mounted on first and second axle seats like seat 38.

Although the invention has been described in some detail with reference to a presently preferred embodiment hereof it will be understood that modifications other than those specifically enumerated may be effected without departing from the scope and spirit of the invention.

Having described our invention in accordance with the requirements of the patent statutes, we claim:

1. A suspension arrangement for an axle unit comprising a supporting member, said supporting member comprising an elongate tubular member and seating means mounted on said tubular member for supportably mounting an axle, means for pivotably mounting one end of said supporting member on an automotive vehicle, air spring means affixed to the other end of said supporting member, means for mounting said air spring means on an automotive vehicle, and safety means located within said tubular member and extending along the longitudinal axis thereof for providing a supporting connection between said pivotable mounting means and said air spring upon failure of said tubular member and for providing an indication of the occurrence of such a failure.

2. A suspension arrangement as claimed in claim 1 wherein said safety means comprises chain means and means for supporting said chain means at opposite ends thereof such that some slack exists therein under normal conditions, said chain being tensioned between said supporting means upon a failure in said tubular supporting member and the movement of said chain means from a slack state to a tensioned state providing an indication of the occurrence of such a failure.

3. A suspension arrangement as claimed in claim 2 further comprising means mounting said seating means on said tubular member to permit at least some rotational movement of said seating means on said tubular member and to permit longitudinal movement of said seating means along said tubular member.

4. A suspension arrangement in accordance with claim 3 wherein said seating means comprises a semi-cylindrical seat and said mounting means comprises a cylindrical collar fixed to said seat and surrounding said tubular member, the longitudinal axis of said seat being perpendicular to the longitudinal axis of said collar.

5. A suspension arrangement in accordance with claim 1 further comprising means mounting said seating means on said tubular member to permit at least some rotation of said seating means on said tubular member.

6. A suspension arrangement in accordance with claim 5 wherein said means for mounting said seating means to said tubular member permits adjustment of the position of said seating means along the longitudinal extent of said tubular member.

7. A suspension arrangement in accordance with claim 5 wherein said seating means comprises a semi-cylindrical seat and said mounting means comprises a cylindrical collar affixed to said seat and surrounding said tubular member, the longitudinal axis of said seat being perpendicular to the longitudinal axis of said collar.

8. A suspension arrangement in accordance with claim 1 further comprising means for variably fixing the position of said seating means along the longitudinal extent of said tubular member.

9. A suspension arrangement in accordance with claim 8 wherein said means for variably fixing the position of said seating means comprises an annular stop located on said tubular member and at least one ring clamp.

References Cited

UNITED STATES PATENTS

| | | | |
|---|---|---|---|
| 1,736,113 | 11/1929 | Dotson | 267—51 |
| 3,332,701 | 7/1967 | Masser | 280—124 |

A. HARRY LEVY, Primary Examiner

U.S. Cl. X.R.

267—65; 280—80